(12) United States Patent
Happ et al.

(10) Patent No.: US 11,092,239 B2
(45) Date of Patent: Aug. 17, 2021

(54) SEAL DEVICE AND SEAL ASSEMBLY

(71) Applicant: Schaeffler Technologies AG & Co. KG, Herzogenaurach (DE)

(72) Inventors: Alexander Happ, Hofheim/Lendershausen (DE); Marco Krapf, Burkardroth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 144 days.

(21) Appl. No.: 16/466,167

(22) PCT Filed: Oct. 25, 2017

(86) PCT No.: PCT/DE2017/100916
§ 371 (c)(1),
(2) Date: Jun. 3, 2019

(87) PCT Pub. No.: WO2018/108202
PCT Pub. Date: Jun. 21, 2018

(65) Prior Publication Data
US 2020/0063868 A1    Feb. 27, 2020

(30) Foreign Application Priority Data

Dec. 16, 2016   (DE) .......................... 102016124571.2

(51) Int. Cl.
*F16J 15/3232*    (2016.01)
*F16C 33/78*      (2006.01)

(52) U.S. Cl.
CPC ....... *F16J 15/3232* (2013.01); *F16C 33/7876* (2013.01)

(58) Field of Classification Search
CPC ...... F16J 15/3232; F16J 15/32; F16J 15/3236; F16J 15/00; F16C 33/7876;
(Continued)

(56) References Cited

U.S. PATENT DOCUMENTS

| 8,474,825 B2 * | 7/2013 | Nakagawa | F16J 15/164 277/353 |
| 2007/0090604 A1 * | 4/2007 | Shibayama | F16J 15/3264 277/349 |

(Continued)

FOREIGN PATENT DOCUMENTS

| CN | 203189534 | 9/2013 |
| DE | 212014000153 | 3/2016 |

(Continued)

OTHER PUBLICATIONS

International Search Report, corresponding International Application, PCT/DE2017/10091, 2 pages.

*Primary Examiner* — Nathan Cumar
(74) *Attorney, Agent, or Firm* — Volpe Koenig (57) ABSTRACT

The invention relates to a seal device (1) for sealing two bearing elements which rotate relative to each other about an axis (D), in particular for sealing a rolling bearing. The seal device (1) includes a sealing section (2) for sealing purposes and a fastening section (3) for holding the seal device (1) against a bearing element (21). The sealing section (2) is arranged at one end of the fastening section (3) and includes a free end (E) opposite thereof. All the sections (2, 3) have a common carrier element (4) and at least one sealing element (5), and all the sections (2, 3) extend in the radial direction (R) and/or in the axial direction (A). The fastening section (3) extends at least partly in the axial direction (A) such that the carrier element (4) and the sealing element (5) rest directly against a bearing element (21) in order to form a clamping seat in the radial direction (R) by the carrier element (4) in order to hold against a bearing element (21) and a static seal by the seal element (5) in order to seal against a bearing element (21). The invention further relates to a seal assembly (20) for a rolling bearing, in particular for (Continued)

a wheel bearing assembly, including a bearing element (21) and a seal device (1).

13 Claims, 4 Drawing Sheets

(58) Field of Classification Search
CPC .............. F16C 33/7873; F16C 33/7869; F16C 33/7883; F16C 33/00; F16C 33/72; F16C 33/76
USPC ......................................................... 277/562
See application file for complete search history.

(56) References Cited

U.S. PATENT DOCUMENTS

| | | | | |
|---|---|---|---|---|
| 2008/0124016 A1* | 5/2008 | Shimizuya | ............ | F16C 19/186 384/484 |
| 2010/0244388 A1* | 9/2010 | Nakagawa | ............ | F16C 33/805 277/559 |
| 2011/0006485 A1* | 1/2011 | Nakagawa | ............ | F16J 15/3264 277/549 |
| 2011/0069917 A1* | 3/2011 | Yamada | ................. | B65G 39/09 384/470 |
| 2011/0221140 A1* | 9/2011 | Nakagawa | ............ | F16J 15/3264 277/412 |
| 2013/0127119 A1* | 5/2013 | Haepp | ................. | F16C 33/7863 277/351 |

FOREIGN PATENT DOCUMENTS

| | | |
|---|---|---|
| EP | 2623915 | 8/2013 |
| EP | 2636915 A1 | 9/2013 |
| JP | H08145189 | 6/1996 |
| JP | 2011117529 | 6/2011 |
| JP | 2011133053 | 7/2011 |
| JP | 2014169724 | 9/2014 |
| JP | 2015227673 | 12/2015 |
| JP | 2016017579 | 2/2016 |

\* cited by examiner

SEAL DEVICE AND SEAL ASSEMBLY

BACKGROUND

The invention relates to a seal device for sealing two bearing elements that can rotate relative to each other about an axis, especially for sealing a rolling bearing. The invention further relates to a seal assembly for a rolling bearing, especially a wheel bearing assembly, with a bearing element and a seal device.

When mounted on an outer ring, conventional seal devices or radial shaft seal rings form a static seal with the outer lateral surface of the outer ring. This protects the entire seal device from soiling, contamination, and corrosion.

To reliably clamp the seal device on the outer ring, this has a carrier element that contacts the inner lateral surface of the outer ring.

Such an arrangement with a static seal on the outside or on the outer lateral surface of an outer ring and a clamped connection on the inside or on the inner lateral surface of the outer ring must be assembled with care.

This is because assembly errors will quickly lead to a failure of the seal device if the seal device or its static seal is not assembled on the outer ring with care.

SUMMARY

Therefore, the object of the present invention is to provide a seal device or a seal assembly for a rolling bearing, which can be manufactured in a way that is not only economical and reduces consumption of materials, but also has an improved sealing performance, especially in wheel bearing seals, and preferably guarantees an improved seal with respect to a circulating (dirty) water volume.

This object is achieved according to the invention by the features of the independent claims. Other advantageous refinements are the subject matter of the dependent claims.

According to the invention, in a first aspect of the present invention, a seal device for sealing two bearing elements that rotate relative to each other about an axis, especially for sealing a rolling bearing, comprises a sealing section for sealing and a fastening section for holding the seal device on a bearing element.

Preferably, the sealing section is arranged on a first end of the fastening section and comprises a free end opposite the first end.

Preferably, all sections have a common carrier element and at least one sealing element. In this way, mechanical stability and a sealing function can be imparted to the seal device.

It is also preferred if all sections extend in the radial direction and/or in the axial direction. In this way, the seal device can have almost any shape.

In addition, it is advantageous if the fastening section extends at least partially in the axial direction for the direct contacting of the carrier element and the sealing element on a bearing element. In this way, a force fit can be formed by the carrier element in the radial direction for holding on a bearing element and a static seal can be formed by the sealing element for sealing against a bearing element.

It is further preferred that the carrier element and the sealing element are arranged one behind the other in the axial direction for the direct contacting on the bearing element. In other words, it is advantageous if the carrier element and the sealing element are arranged in a line, especially in the axial direction, for the direct contacting on the bearing element.

In addition, it is advantageous if the sealing element extends past the carrier element in the fastening section in the radial direction, directed outward from a rotational axis of the seal device. Thus, a secure static seal against a bearing element can be guaranteed.

It can also be provided that the sealing section extends at least partially in the radial direction for the direct contacting of the carrier element on a bearing element. This has the advantage that a stop for positioning on a bearing element can be formed by the carrier element.

In addition, it is preferred that the seal device has an extension on the sealing section, which extends in the radial and/or axial direction and can be formed preferably by the sealing element.

Preferably, the extension forms, together with the sealing section and the fastening section, a U-shaped cross section for holding a bearing element.

It is further advantageous if the extension is arranged on the free end of the sealing section. Thus, the extension can extend away from the free end of the sealing section in the radial and/or axial direction, in order to form, for example, a non-contacting or non-abrasive pre-seal.

It is also advantageous if the extension on the sealing section surrounds or wraps around the carrier element on the free end. Thus, the extension can protect the carrier element, for example, from corrosion.

A second aspect of the present invention comprises a seal assembly for a rolling bearing, especially a wheel bearing assembly, with a bearing element and with a seal device.

It is explicitly noted that the features of the seal device, as mentioned under the first aspect, can be used individually or in combination with each other in the seal assembly.

In other words, the features specified above concerning a seal device under the first aspect of the invention can also be combined here with other features under the second aspect of the invention.

Advantageously, the seal assembly for a rolling bearing, especially a wheel bearing assembly, as already mentioned, comprises a bearing element and a seal device according to the first aspect of the present invention.

Preferably, the bearing element comprises, in the radial direction, an inner and an outer lateral surface, as well as, in the axial direction, an end side that connects the inner lateral surface to the outer lateral surface.

Advantageously, for positioning the seal device, its sealing section is arranged on the end side of the bearing element and, for holding the seal device, its fastening section is arranged on the inner lateral surface of the bearing element. In this way, the carrier element and the sealing element in the fastening section of the seal device can contact directly on the inner lateral surface of the bearing element. Thus, a force fit can be formed by the carrier element in the radial direction for holding on the inner lateral surface of the bearing element and a static seal can be formed by the sealing element for sealing against the outer lateral surface of the bearing element.

It is also preferred if the seal device on the free end of the sealing section has an extension that is formed by the sealing element such that a seal gap is formed between the extension and the outer lateral surface of the bearing element, which preferably sets the outer lateral surface and the extension apart from each other, especially in the radial direction. In this way, a non-abrasive pre-seal can be formed between the extension of the seal device and the outer lateral surface of the bearing element.

It is further advantageous if the end side of the bearing element comprises a first part for the arrangement of the sealing section of the seal device and a second part for forming a labyrinth seal.

Preferably, the second part of the end side surrounds at least partially the sealing section, in order to form a labyrinth seal.

In addition, it is advantageous if the second part of the end side forms an annular recess, in order to form a labyrinth seal with the sealing section of the seal device.

It is also preferred if the extension is arranged at least partially within the second part of the end side of the bearing element and spaced apart from the second part. In this way, it is possible to cover an axial seal gap between the extension and the second part of the end side.

An axial seal gap is understood to be a seal gap that sets, for example, the extension and the end side of the bearing element or its second part apart from each other in the radial direction.

In addition, it is advantageous if the second part of the end side comprises a base, a first side part, and a second side part. Thus, viewed in cross section, the second part of the end side preferably has a U-shaped construction.

Preferably, the extension is arranged at least partially within the second part of the end side of the bearing element and at a distance to the base of the second part of the end side. In this way, it can be guaranteed to cover an axial seal gap between the extension and the base by the first side part of the second part of the end side.

Here, it is advantageous if the axial seal gap sets the base of the first side part apart from the extension in the axial direction.

In addition, it can be provided that the bearing element comprises a drainage channel for collecting and draining a lubricant.

Advantageously, the extension extends into the drainage channel. In this way, for example, a lubricant or contaminant can always be fed back into the drainage channel by the extension.

Preferably, the extension has a step-like construction.

It is also preferred if the inner lateral surface of the bearing element follows the shape of the extension, in particular, has a step-like construction.

A step-like construction allows the formation of a labyrinth seal.

In addition, it is advantageous if the extension forms a collection channel, wherein advantageously the collection channel has a construction that is open in the radial direction. In this way, it is possible by the collection channel to collect, for example, contaminating particles or lubricant.

Preferably, the extension surrounds, together with the seal section and the fastening section, the second part of the end side of the bearing element. In other words, it is advantageous if, viewed in cross-section, the sealing section, the fastening section, and the extension have a C-shaped or U-shaped construction, in which a bearing element can be arranged.

It is further advantageous if the carrier element comprises a stainless steel. This can provide a measure that counteracts corrosion.

BRIEF DESCRIPTION OF THE DRAWINGS

The invention will be explained in more detail below with reference to embodiments in connection with associated drawings. These show schematically.

DETAILED DESCRIPTION

In the following description, the same reference symbols are used for the same objects.

Figure 1:
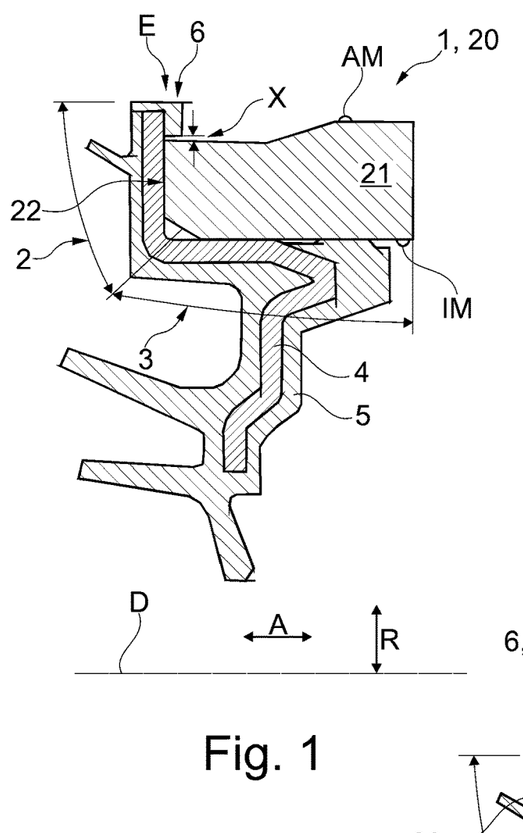
FIG. 1 a sectional view of a seal assembly according to the invention with a bearing element and a seal device according to a first embodiment, FIG. 2 a sectional view of a seal assembly according to the invention with a bearing element and a seal device according to a second embodiment, FIG. 3 an enlargement from FIG. 2, FIG. 4 a sectional view of a seal assembly according to the invention with a bearing element and a seal device according to a third embodiment, FIG. 5 a sectional view of a seal assembly according to the invention with a bearing element and a seal device according to a fourth embodiment, FIG. 6 a sectional view of a seal assembly according to the invention with a bearing element and a seal device according to a fifth embodiment, and FIG. 7 a sectional view of a seal assembly according to the invention with a bearing element and a seal device according to a sixth embodiment.

FIG. 1 shows a section view of a seal assembly 20 according to the invention with a bearing element 21 and a seal device 1 according to a first embodiment.

FIG. 1 shows, in more detail, a seal assembly 20 with a seal device 1, wherein the seal device 1 will be described first.

The seal device 1 for sealing a rolling bearing comprises a sealing section 2 for sealing and a fastening section 3 for holding the seal device 1 on a bearing element 21.

Here, the sealing section 2 is arranged on one end of the fastening section 3. The sealing section 2 further has a free end E opposite the end of the fastening section 3 or the fastening section 3.

Both sections 2, 3 comprise a common carrier element 4 and a sealing element 5, wherein the sealing section 2 extends in the radial direction R and the fastening section 3 extends in the radial R and axial direction A.

For the direct contacting of the carrier element 4 and the sealing element 5 on the bearing element 21, the fastening section 3 extends at least or at least partially in the axial direction A, in order to form a force fit in the radial direction R by the carrier element 4.

This force fit is used for holding on the bearing element 21, wherein a static seal for sealing against the bearing element 21 is formed simultaneously by the sealing element 5.

So that the carrier element 4 and the sealing element 5 can contact directly on the bearing element 21, these are arranged one behind the other—as FIG. 1 shows—in the axial direction A.

In this way, a secure static seal against the bearing element 21 can be guaranteed, wherein, in the radial direction R, directed outward from a rotational axis D of the seal device 1, the sealing element 5 extends past the carrier element 4 in the fastening section 3. This condition cannot be seen visually in FIG. 1.

Furthermore, as already indicated, the sealing section 2 extends in the radial direction R for the direct contacting of the carrier element 4 on the bearing element 21, in order to form a stop for positioning on the bearing element 21 by the carrier element 4.

As FIG. 1 also shows, the seal device 1 has an extension 6 on the sealing section 2. This extension 6 is arranged on the free end E of the sealing section 2 and extends in the radial and axial directions R, A.

Here, the extension 6 is formed by the sealing element 5 and further forms, together with the sealing section 2 and the fastening section 3, a U-shaped cross section for holding the bearing element 21.

FIG. 1 also shows a seal assembly 20 for a rolling bearing, especially a wheel bearing assembly, with a bearing element 21 and with a seal device 1.

The bearing element 21 comprises, in the radial direction R, an inner lateral surface IM and an outer lateral surface AM, and also, in the axial direction A, an end side 22 that connects the inner lateral surface IM with the outer lateral surface AM.

For positioning the seal device 1, its sealing section 2 is arranged on the end side 22 of the bearing element 21 and for holding the seal device 1, its fastening section 3 is arranged on the inner lateral surface IM of the bearing element 21.

Therefore, the carrier element 4 and the sealing element 5 in the fastening section 3 of the seal device 1 directly contact on the inner lateral surface IM of the bearing element 21. In this way, a force fit is formed by the carrier element 4 in the radial direction R for holding on the inner lateral surface IM of the bearing element 21 and a static seal is formed by the sealing element 5 for sealing against the inner lateral surface IM of the bearing element 21.

As already mentioned, the seal device 1 comprises an extension 6 on the free end E of the sealing section 2. This extension is formed by the sealing element 5 such that a seal gap X is formed between the extension 6 and the outer lateral surface AM of the bearing element 21, wherein a non-abrasive pre-seal is formed between the extension 6 of the seal device 1 and the outer lateral surface AM of the bearing element 21.

Figure 2:
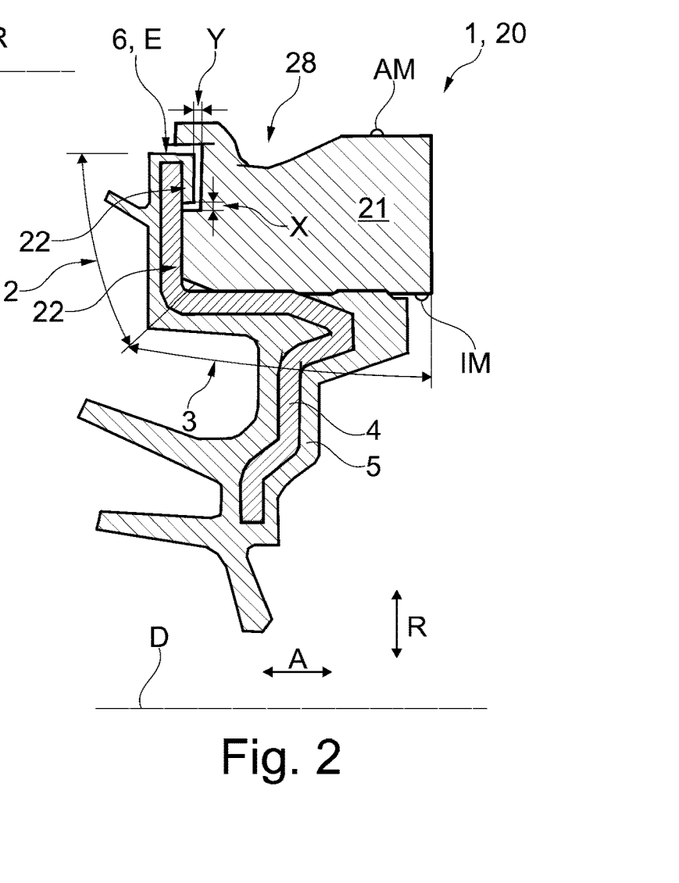

FIG. 2 shows a section view of a seal assembly 20 according to the invention with a bearing element 21 and a seal device 1 according to a second embodiment. Here, FIG. 3 shows an enlargement from FIG. 2.

Concerning the additional constructions, in order to avoid unnecessary repetitions, refer to the first embodiment according to FIG. 1, which can be applied here analogously.

Therefore, the discussion below refers only to the differences between the first and second embodiments.

Figure 3:
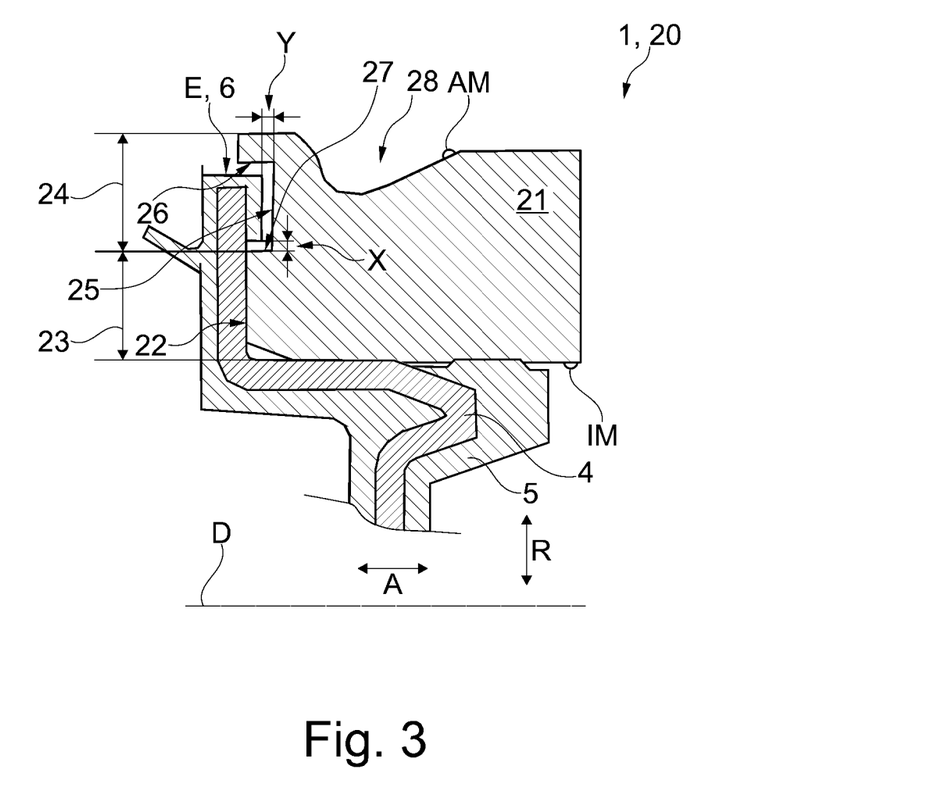

In comparing FIGS. 1 and 2, it is to be stated first that the bearing element 21 has different constructions, while the seal device 1 has an identical construction in FIGS. 1, 2, and 3.

Thus, it is to be seen in FIG. 3 that the end side 22 of the bearing element 21 comprises a first part 23 for the arrangement of the sealing section 2 of the seal device 1 and a second part 24 for forming a labyrinth seal.

Here, the second part 24 of the end side 22 partially surrounds the sealing section 2 or the extension 6, in order to form a labyrinth seal.

So that it is possible to form a surrounding connection, the second part 24 of the end side 22 forms an annular recess, in order to form, with the sealing section 2 of the seal device 1, a labyrinth seal.

The second part 24 of the end side 21 comprises a base 25, a first 26 and a second part 27.

Here, the extension 6 is arranged partially within the second part 24 of the end side 22 of the bearing element 21 or in the annular recess and at a distance to the base 25 of the second part 24 of the end side 22. In this way, an axial seal gap Y between the extension 6 and the base 25 is covered by the first side part 26 of the second part 24 of the end side 22.

In this way, the labyrinth seal is formed, on one hand, by the seal gap X and, on the other hand, by the seal gap Y, which are both located between the extension 6 and the surface of the second part of the end side 22 of the bearing element 21.

Strictly speaking, a third seal gap is formed, which is located between the first side part 26 and the extension 6.

In summary, the labyrinth seal is formed by the seal gap X, the seal gap Y, and the seal gap between the first side part 26 and the extension 6.

The labyrinth seal thus produces a non-abrasive pre-seal between the extension 6 of the seal device 1 and the bearing element 21.

In addition, FIGS. 2 and 3 show that the outer lateral surface AM of the seal assembly 1 forms a drainage channel 28 for collecting and draining a lubricant or the bearing element 21 comprises the drainage channel 28.

Figure 4:
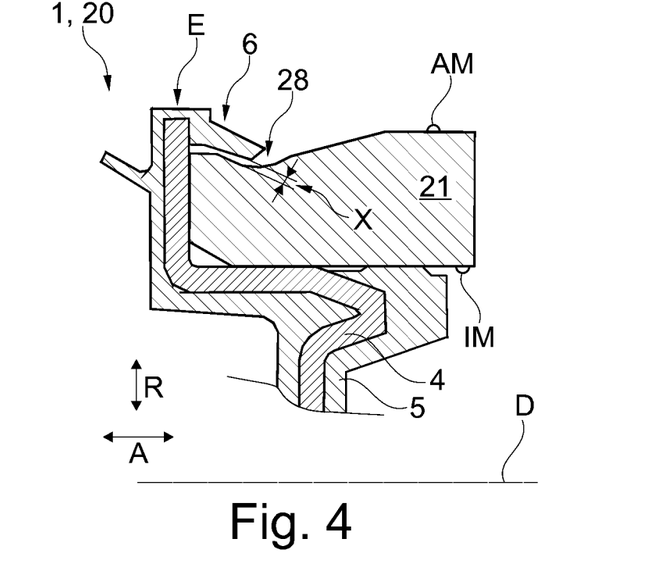

FIG. 4 shows a section view of a seal assembly 20 according to the invention with a bearing element 21 and a seal device 1 according to a third embodiment.

The third embodiment is here very similar to the first embodiment, but with the difference that according to FIG. 4, the bearing element 21 has a drainage channel 28 for collecting and draining contaminating particles, in which the extension 6 extends.

Another difference in the third embodiment from the first is that the seal gap X extends in the radial R and axial direction A, while the seal gap according to FIG. 1 is formed only in the radial direction R between the extension 6 and the outer lateral surface AM.

The other constructions with respect to the first and second embodiment can be applied analogously to the third embodiment.

Figure 5:
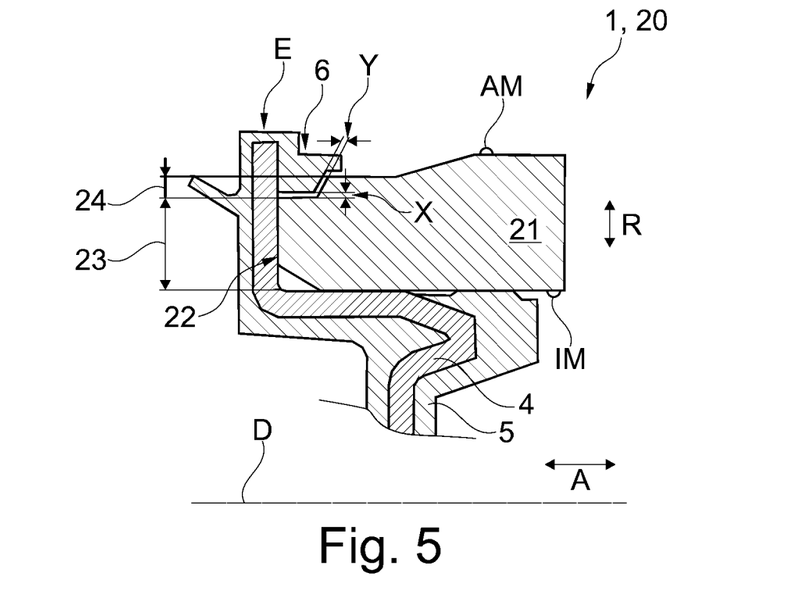

FIG. 5 shows a section view of a seal assembly 20 according to the invention with a bearing element 21 and a seal device 1 according to a fourth embodiment.

The fourth embodiment is very similar to the first embodiment, but with the difference that according to FIG. 4, the extension 6 has a step-like construction.

Furthermore, the outer lateral surface AM of the bearing element 21 follows the shape of the extension 6 and also has a step-like construction.

The other constructions of the previous embodiments can be applied analogously to the fourth embodiment.

Due to the similarity of the embodiments according to FIGS. 6 and 7, these will be described together below, and their differences will be explained.

Figure 6:
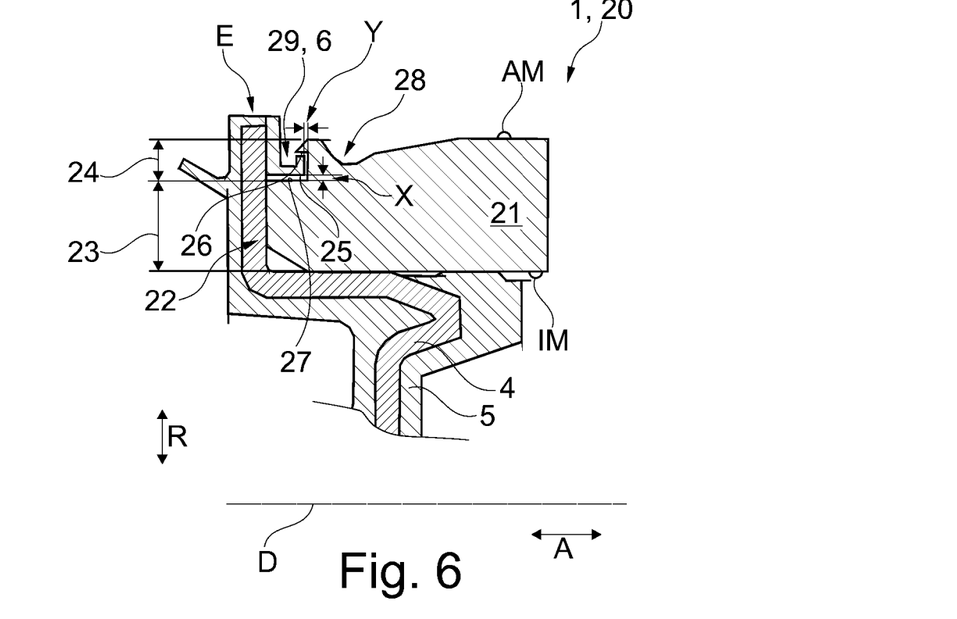

FIG. 6 shows a section view of a seal assembly 20 according to the invention with a bearing element 21 and a seal device 1 according to a fifth embodiment.

Figure 7:
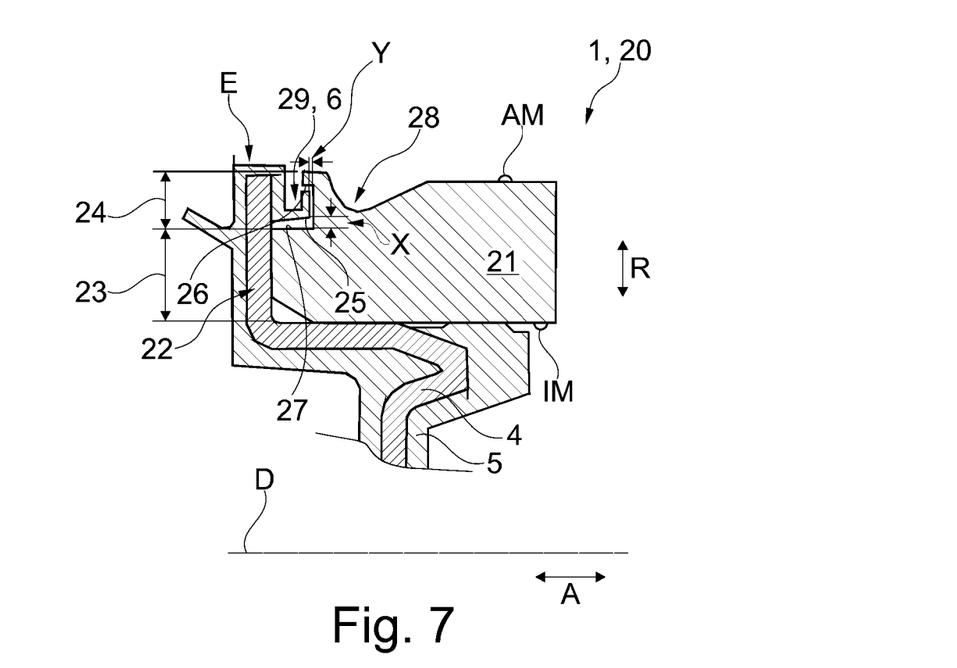

FIG. 7 shows a section view of a seal assembly 20 according to the invention with a bearing element 21 and a seal device 1 according to a sixth embodiment.

The fifth and sixth embodiment are similar to the second embodiment according to FIGS. 2 and 3, but with the difference that the extension 6 surrounds, together with the sealing section 2 and the fastening section 3, the second part 23 of the end side 22 of the bearing element 21 and the projection 6 forms a collection channel 29.

The collection channel 29 here has a construction that is open in the radial direction R, so that lubricant and/or contaminating particles can be collected, in order to stop these from penetrating between the seal device 1 and the bearing element 21.

Similar to the embodiment according to FIGS. 2 and 3, the second part 24 of the end side 22 partially surrounds the sealing section 2 or the extension 6, in order to form a labyrinth seal.

So that it is possible to form a surrounding connection, the second part 24 of the end side 22 forms an annular recess, in order to form, with the sealing section 2 of the seal device 1, a labyrinth seal.

The second part 24 of the end side 21 comprises a base 25, a first 26 and a second side part 27.

The embodiments according to FIGS. 6 and 7 differ only by the shape of the drainage channel 29 and by the second part 24 of the end side 22, which covers the seal gap Y.

LIST OF REFERENCE SYMBOLS

1 Seal device
2 Sealing section
3 Fastening section
4 Carrier element
5 Sealing element
6 Extension
20 Seal assembly
21 Bearing element
22 End side
23 First part of end side
24 Second part of end side
25 Base of second part of end side
26 First side part of second part of end side
27 Second side part of second part of end side
28 Drainage channel
29 Collection channel
A Axial direction
D Rotational axis
E Free end
R Radial direction
AM Outer lateral surface
IM Inner lateral surface
X Seal gap
Y Seal gap

The invention claimed is:

1. A seal device for sealing two bearing elements that rotate relative to each other about an axis, the seal device comprises:
a sealing section for sealing, and
a fastening section configured to hold the seal device on one of the bearing elements,
the sealing section is arranged on a first end of the fastening section and comprises a tree end opposite the first end,
the sealing section and the fastening section have a common carrier element and at least one sealing element, and the carrier element and the sealing section along with the sealing element are arranged adjacent to each other in an axial direction along an axial end side of the bearing element, and the carrier element and the sealing element directly contact an inner lateral surface of the bearing element,
the sealing section and the fastening section extend in at least one of a radial direction or an axial direction,
the fastening section extends at least partially in the axial direction and is configured for direct contacting of the carrier element and the sealing element on the bearing element, in order to form a force fit in the radial direction by the carrier element for holding on the bearing element and to form a static seal by the sealing element for sealing against the bearing element.

2. The seal device according to claim 1, wherein, in the radial direction, directed outward from a rotational axis of the seal device, the sealing element extends past the carrier element in the fastening section, and is configured to guarantee a secure static seal against the bearing element.

3. The seal device according to claim 1, wherein the sealing section extends at least partially in the radial direction and is configured for the direct contacting on the bearing element, in order to form a stop for positioning on the bearing element by the carrier element.

4. A seal assembly for a rolling bearing, comprising:
a bearing element,
a seal device according to claim 1,
the bearing element comprises, in the radial direction, the inner lateral surface and an outer lateral surface, and in the axial direction, the axial end side that connects the inner lateral surface to the outer lateral surface,
the sealing section of the seal device is arranged on the axial end side of the bearing element to position the seal device and the fastening section of the seal device is arranged on the inner lateral surface of the bearing element to hold the seal device on the bearing element, and
the carrier element and the sealing element directly contact the inner lateral surface of the bearing element in the fastening section of the seal device, in order to form a force fit in the radial direction by the carrier element to hold on the inner lateral surface of the bearing element and to form a static seal by the sealing element for sealing against the inner lateral surface of the bearing element.

5. The seal assembly according to claim 4, wherein the seal device comprises, on the free end of the sealing section, an extension that is formed by the sealing element such that a seal gap is produced between the extension and the outer lateral surface of the bearing element, and a non-abrasive pre-seal is formed between the extension of the seal device and the outer lateral surface of the bearing element.

6. The seal assembly according to claim 5, wherein the axial end side of the bearing element comprises a first part for arrangement of the sealing section of the seal device and a second part for forming a labyrinth seal, the second part of the axial end side surrounds at least partially the sealing section, in order to form the labyrinth seal, the second part of the axial end side forms an annular recess, in order to form the labyrinth seal with the sealing section of the seal device, and the extension is arranged at least partially within the second part of the axial end side of the bearing element and at a distance to the second part, in order to cover an axial seal gap between the extension and the second part of the axial end side.

7. The seal assembly according to claim 6, wherein the second part of the axial end side comprises a base, a first side part, and a second side part, the extension is arranged at least partially within the second part of the axial end side of the bearing element and at a distance to the base of the second part of the axial end side, in order to cover the axial seal gap between the extension and the base by the first side part of the second part of the axial end side.

8. The seal assembly according to claim 7, wherein the bearing element comprises a drainage channel for collecting and draining a lubricant, the extension extends into the drainage channel, the extension has a step-shaped construction, the outer lateral surface of the bearing element follows a shape of the extension, the extension forms a collection channel that is open in the radial direction, and the extension surrounds, together with the sealing section and the fastening section, the second part of the axial end side of the bearing element.

9. A seal device for sealing two bearing elements that rotate relative to each other about an axis, the seal device comprises:
a sealing section for sealing, and
a fastening section configured to hold the seal device on one of the bearing elements,
the sealing section is arranged on a first end of the fastening section and comprises a free end opposite the first end,
the sealing section and the fastening section have a common carrier element and at least one sealing element,
the sealing section and the fastening section extend in at least one of a radial direction or an axial direction,
the fastening section extends at least partially in the axial direction and is configured for direct contacting of the carrier element and the sealing element on the bearing element, in order to form a force fit in the radial direction by the carrier element for holding on the bearing element and to form a static seal by the sealing element for sealing against the bearing element,
further comprising an extension on the sealing section that extends in at least one of the radial or axial direction and is formed by the sealing element, the extension forms, together with the sealing section and the fastening section, a U-shaped cross section that is adapted for holding the bearing element, and the extension is arranged on the free end of the seal section.

10. A seal device for sealing two bearing elements that rotate relative to each other about an axis, the seal device comprises:
a fastening section configured to hold the seal device on one of the bearing elements,
a sealing section arranged on a first end of the fastening section and comprises a free end opposite the first end,
the sealing section and the fastening section have a common carrier element and a sealing element affixed to the carrier element,
the sealing section and the fastening section extend in a radial direction and in an axial direction,
the fastening section extends at least partially in the axial direction and is configured for direct contacting of an axially extending part of the carrier element on the bearing element, in order to form a force fit in the radial direction by the carrier element for holding on the bearing element and is configured for direct contact of the seal element on the bearing element to form a static seal,
wherein the seal element is configured for direct contact on an inner lateral surface of the bearing element to form the static seal, and the seal element includes an extension on the free end thereof that extends in an axial direction and is adapted to form a seal gap between the extension and an outer lateral surface of the bearing element.

11. The seal device of claim 10, wherein the extension forms together with the sealing section and the fastening section, a U-shaped cross section that is adapted for holding the bearing element.

12. The seal device of claim 10, wherein the carrier element extends at least partially in a radial direction and is adapted to form a stop against the bearing element.

13. The seal device of claim 10, wherein the carrier element is configured to extend radially beyond the bearing element, and the extension extends over the carrier element and in the axial direction.

* * * * *